US012799906B2

(12) United States Patent
Uhrich et al.

(10) Patent No.: US 12,799,906 B2
(45) Date of Patent: Nov. 17, 2026

(54) SYSTEMS AND METHODS FOR EXHAUST GAS SENSOR MONITORING IN VARIABLE DISPLACEMENT ENGINES

(71) Applicant: Ford Global Technologies, LLC, Dearborn, MI (US)

(72) Inventors: Michael Uhrich, Wixom, MI (US); Rani Kiwan, West Bloomfield, MI (US); Chris Paul Glugla, Macomb, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 310 days.

(21) Appl. No.: 18/435,598

(22) Filed: Feb. 7, 2024

(65) Prior Publication Data

US 2025/0250948 A1 Aug. 7, 2025

(51) Int. Cl.

*F02D 41/14* (2006.01)
*F02D 41/22* (2006.01)
*F02D 41/30* (2006.01)

(52) U.S. Cl.

CPC ....... *F02D 41/1495* (2013.01); *F02D 41/222* (2013.01); *F02D 41/3017* (2013.01)

(58) Field of Classification Search

CPC ........................... F02D 41/222; F02D 41/1495
See application file for complete search history.

(56) References Cited

U.S. PATENT DOCUMENTS

| | | | | |
|---|---|---|---|---|
| 7,225,801 | B2 * | 6/2007 | Pallett | F02D 41/1443 123/688 |
| 8,036,814 | B2 | 10/2011 | Weber et al. | |
| 9,188,045 | B2 | 11/2015 | Banker et al. | |
| 9,500,151 | B2 | 11/2016 | Jammoussi et al. | |
| 11,649,780 | B1 * | 5/2023 | Bagnasco | F01N 11/007 123/445 |
| 2008/0307851 | A1 * | 12/2008 | Smith | F02D 41/1446 73/1.06 |
| 2011/0082622 | A1 * | 4/2011 | Wehmeier | F02D 41/1454 701/29.2 |
| 2015/0046063 | A1 * | 2/2015 | Jammoussi | F02D 41/1495 701/102 |
| 2019/0072020 | A1 * | 3/2019 | Hagiwara | F01N 11/007 |
| 2024/0272038 | A1 * | 8/2024 | Bagnasco | F02D 41/1495 |

* cited by examiner

*Primary Examiner* — Eric S. McCall
(74) *Attorney, Agent, or Firm* — McCoy Russell LLP

(57) ABSTRACT

A method of monitoring an exhaust gas sensor coupled in an engine exhaust in an engine is provided. The method includes entering into a variable displacement engine (VDE) mode wherein intake and exhaust valves of a first subset of cylinders of the engine are activated and intake and exhaust valves of a second subset of cylinders of the engine are deactivated prior to a reduced traction fuel shut-off transition; and executing a six-pattern diagnostic during fuel shut-off to identify exhaust gas sensor degradation.

20 Claims, 7 Drawing Sheets

SYSTEMS AND METHODS FOR EXHAUST GAS SENSOR MONITORING IN VARIABLE DISPLACEMENT ENGINES

FIELD

The present description relates generally to monitoring and diagnostics of an exhaust gas sensor in a motor vehicle.

BACKGROUND/SUMMARY

An exhaust gas sensor may be positioned in an exhaust system of a vehicle to detect an air-fuel ratio of exhaust gas exhausted from an internal combustion engine of the vehicle. The exhaust gas sensor readings may be used to control operation of the internal combustion engine to propel the vehicle.

Degradation of an exhaust gas sensor may cause engine control degradation that may result in increased emissions and/or reduced vehicle drivability. In addition, on-board diagnostic requirements may require detection of six specific types of degradation. Therefore, it may be desirable to provide accurate determination of exhaust gas sensor degradation. The six behavior types that have diagnostic requirements in some regions of the world may be categorized as asymmetric type degradation (e.g., rich-to-lean asymmetric delay, lean-to-rich asymmetric delay, rich-to-lean asymmetric slow response, lean-to-rich asymmetric slow response) that affects lean-to-rich or rich-to-lean exhaust gas sensor response rates differently, and symmetric type degradation (e.g., symmetric delay, symmetric slow response) the affects lean-to-rich and rich-to-lean exhaust gas sensor response rates equally. The delay type degradation behaviors may be associated with the initial reaction of the exhaust gas sensor to a change in exhaust gas composition and the slow response type degradation behaviors may be associated with a duration after an initial exhaust gas sensor response to transition from a rich-to-lean or lean-to-rich exhaust gas output.

Previous approaches to monitoring exhaust gas sensor degradation, particularly identifying one or more of the six degradation behaviors, have relied on direct data collection, such as via the universal exhaust gas oxygen (UEGO) six-pattern diagnostic. That is, an engine may be purposely operated with one or more rich-to-lean or lean-to-rich transitions to monitor exhaust gas sensor response. Attempts have also been made to monitor exhaust gas sensor degradation during a reduced traction fuel shut-off transition to perform an unobtrusive diagnostic operation. The term reduced traction fuel shut-off refers to a feature in engine management systems that temporarily stops fuel injection during periods of speed reduction, such as while slowing down or coasting, which increases fuel efficiency and reduces emissions.

However, as the engine enters into or exits from fuel shut-off, injectors of the engine can ramp off or on randomly, for example based on torque scheduling. Random injector ramping may cause variability in the timestamp of the six-pattern monitor entry. The spread of these ramps may equal the delay that the six-pattern diagnostic has to detect, for example around 600 to 800 milliseconds. A fuel shut-off entry or exit with high variability in injector ramp off/on may not be usable for six-pattern monitoring, which affects monitoring completion time.

Further, V-8 engines, or other eight-cylinder engines, to date have been developed with a single exhaust gas sensor for every four cylinders. In such engines, four injectors ramping into a fuel shut-off event may cause large variability with degradation behavior six-pattern diagnostics. On the other hand, certain sensor configuration, such as quad-UEGO sensor configuration, reduce this variability by reducing the number of cylinders to two for each exhaust gas sensor. However, variability in six-pattern diagnostics as outlined above due to random injector ramping remains.

The inventors herein have recognized the above issues and have overcome at least some of the issues via a strategy for more robust fuel shut-off-based six-pattern diagnostics of exhaust gas sensors. The strategy herein disclosed includes entering into variable displacement mode (VDE), e.g., four-cylinder mode, prior to a fuel shut-off transition. The strategy herein described may be executed in an environment in which one exhaust gas sensor corresponds to two cylinders of the engine (e.g., a quad-UEGO sensor environment). When the fuel shut-off transition is an entry, entering four-cylinder mode may comprise ramping injectors off to deactivate a first subset of the eight cylinders such that a second, non-overlapping subset of the eight cylinders are active. The second subset may include a cylinder for each exhaust gas sensor, thereby allowing a 1:1 ratio of sensors to cylinders. When the fuel shut-off transition is an exit, entering four-cylinder mode may comprise ramping injectors on to activate the second subset of cylinders.

By entering into VDE mode prior to fuel shut-off entry or exit when the engine has a 1:1 sensor to cylinder ratio configuration, each exhaust gas sensor can see only one cylinder. Allowing each sensor to see only one cylinder mitigates injector ramping variability.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
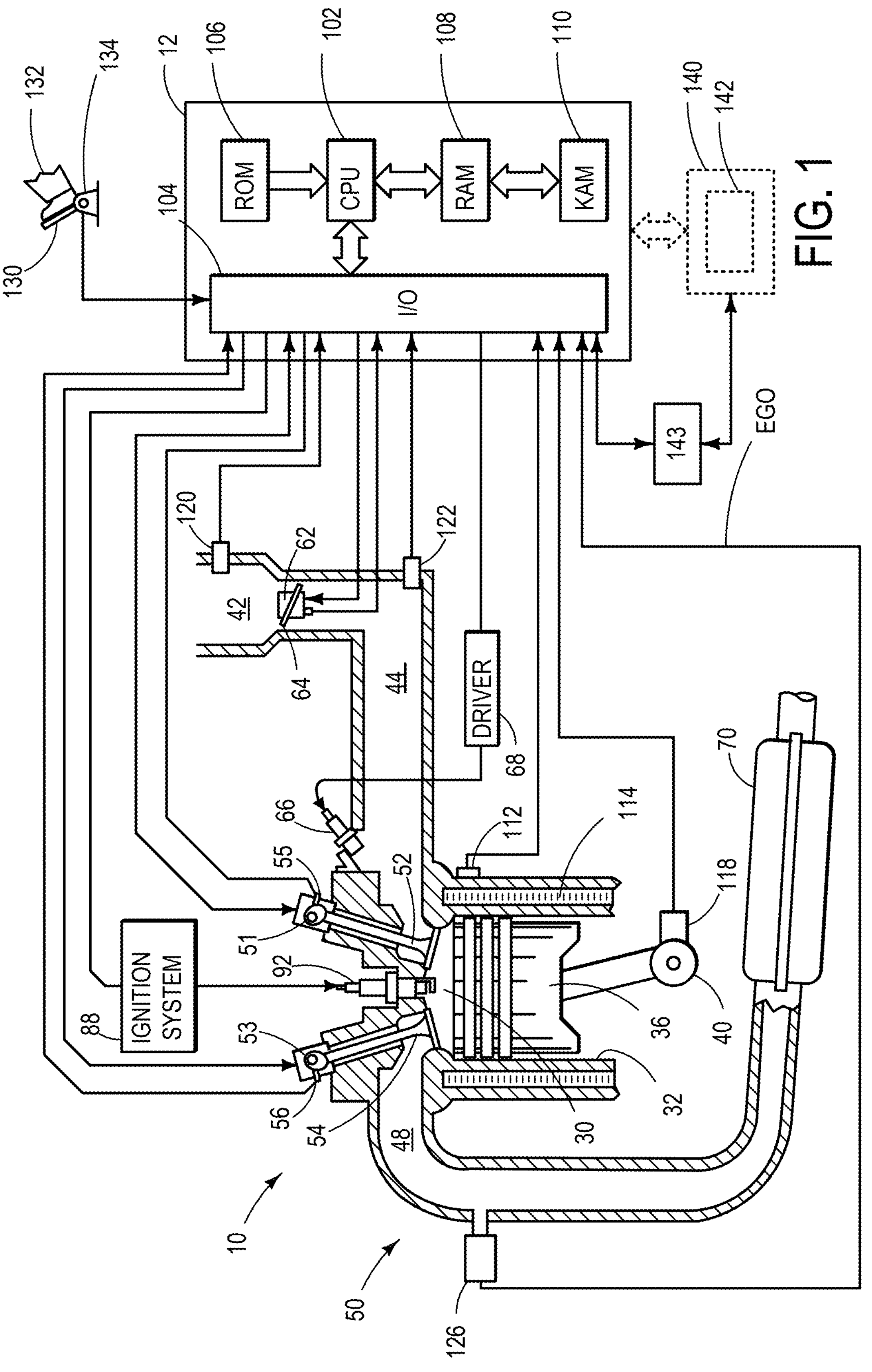
FIG. 1 shows a schematic diagram of an embodiment of a propulsion system of a vehicle including an exhaust gas sensor.
Figure 8:
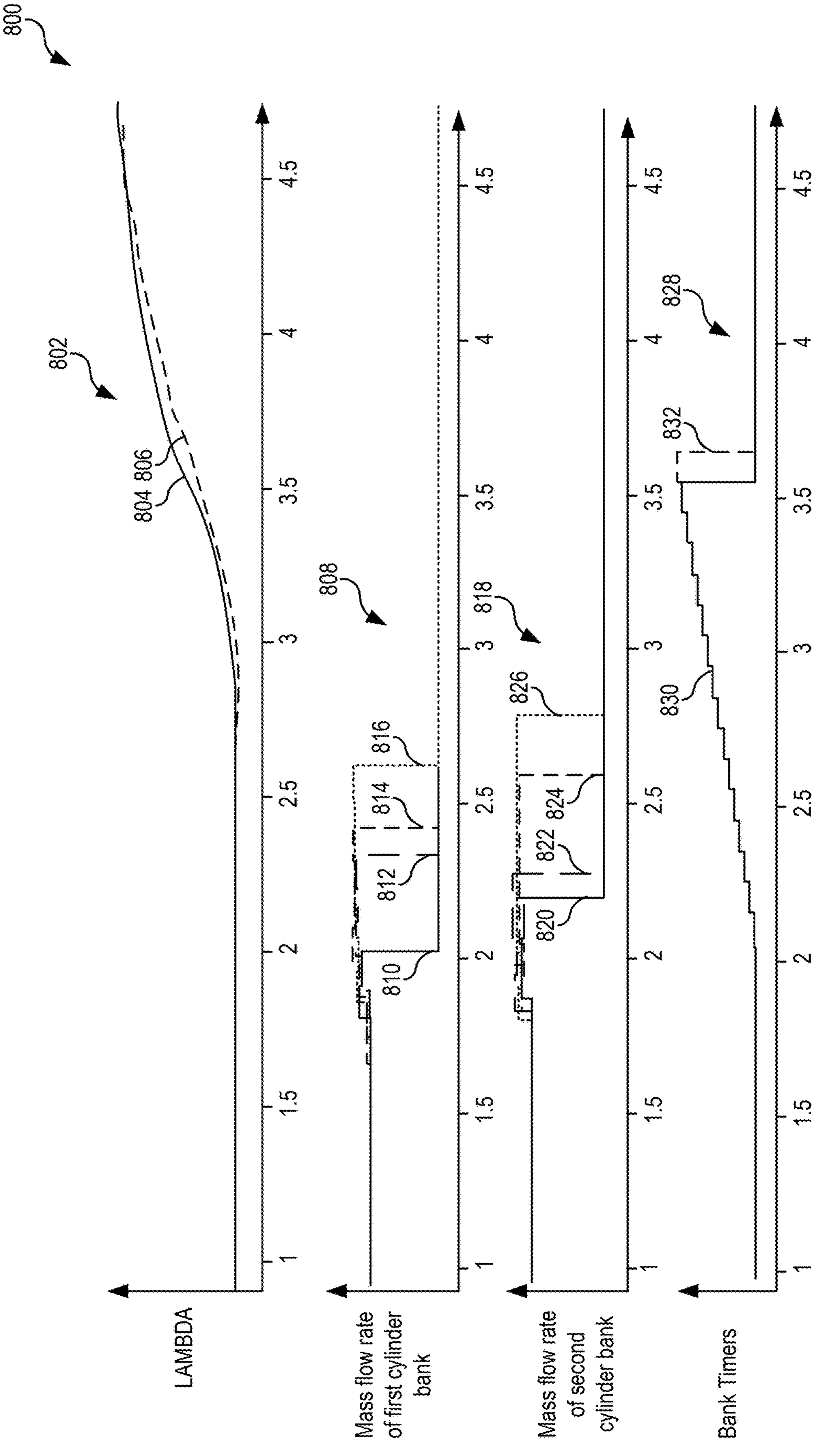
FIG. 8 shows a plurality of graphs indicating injector ramping entering a reduced traction fuel shut-off event.
Figure 9:
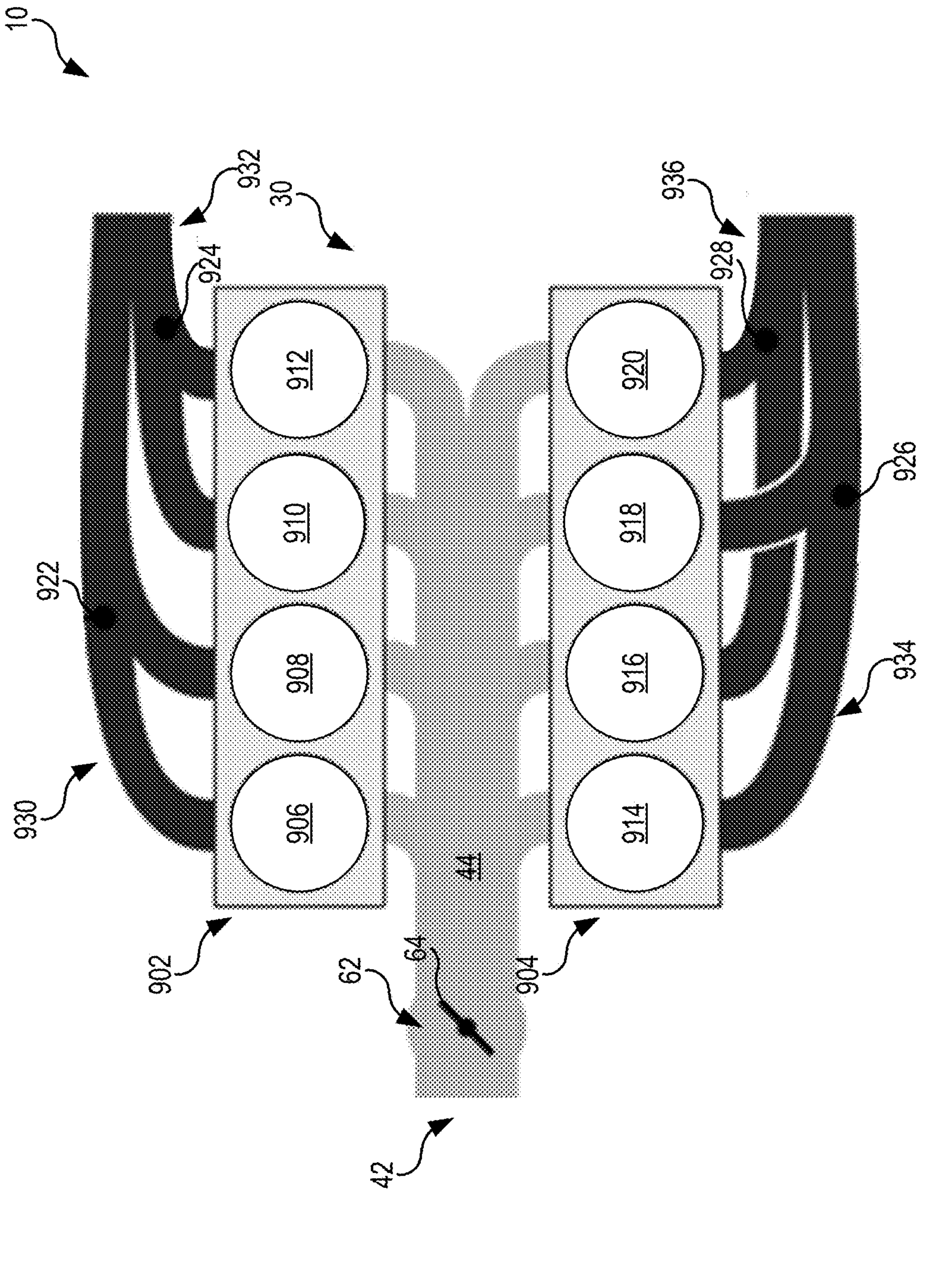
FIG. 9 shows a diagram of an exhaust gas sensor set up for a V-8 engine.
Figure 10:
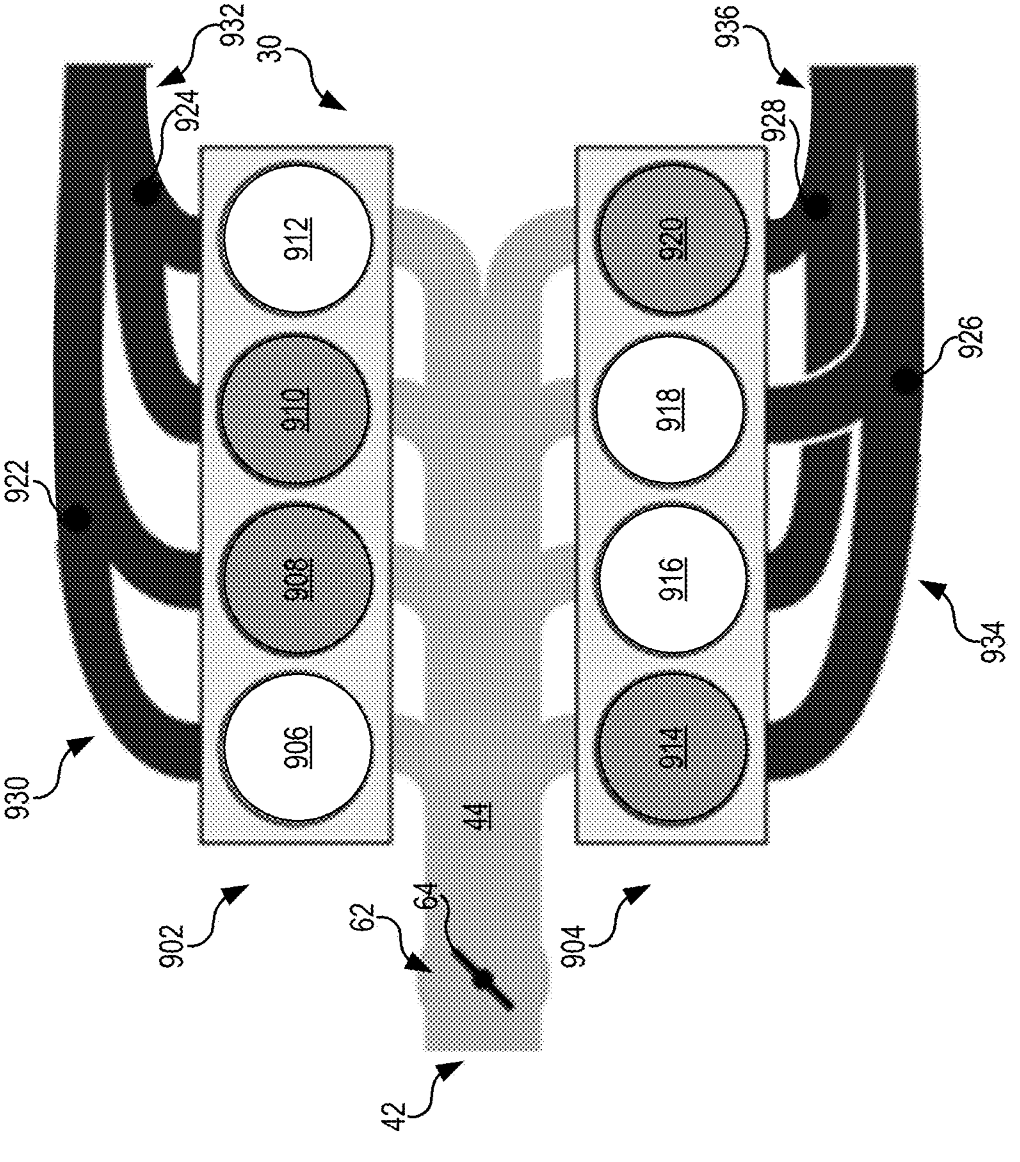
FIG. 10 shows a diagram of the exhaust gas sensor set of FIG. 9 in V-4 mode.

The following description relates to an approach for determining degradation of an exhaust gas sensor. More particularly, the systems and method described below may be implemented to determine exhaust gas sensor degradation prior to a reduced traction fuel shut-off transition (e.g., entry into or exit from a fuel shut-off event). In this way, a robust fuel shut-off-based six-pattern diagnostic algorithm may be unobtrusively employed with reduced injector ramping variability. This approach may be applied to an engine of the type that is shown in FIG. 1. FIGS. 2-7 show expected and degraded lambda for each of the six degradation behaviors of the exhaust gas sensor. FIG. 8 shows example injector rampings entering a fuel shut-off event. FIG. 9 shows an example exhaust gas sensor set up for a V-8 engine and FIG. 10 shows an example exhaust gas sensor set up for a V-4 mode of the V-8 engine. FIG. 9 is an example method for executing an exhaust gas sensor diagnostic prior to fuel shut-off entry and FIG. 10 is an example method for executing an exhaust gas sensor diagnostic prior to fuel shut-off exit.

FIG. 1 is a schematic diagram showing one cylinder of a multi-cylinder engine 10. In some examples, the multi-cylinder engine 10 may be a V-8 engine that comprises eight cylinders. The multi-cylinder engine 10 may be included in a propulsion system of a vehicle in which an exhaust gas sensor 126 may be utilized to determine an air-fuel ratio of exhaust gas produced by engine 10. The air-fuel ratio (along with other operating parameters) may be used for feedback control of engine 10 in various modes of operation. Engine 10 may be controlled at least partially by a control system including controller 12 and by input from a vehicle operator 132 via an input device 130. In this example, input device 130 is a driver demand pedal and position of the driver demand pedal may be sensed via a pedal position sensor 134. Combustion chamber (e.g., cylinder) 30 of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operating of engine 10.

Combustion chamber 30 may receive intake air from intake manifold 44 via intake passage 42 and may exhaust combustion gases via exhaust passage 48. Intake manifold 44 and exhaust passage 48 can selectively communicate with combustion chamber 30 via respective intake valve 52 and exhaust valve 54. In some embodiments, combustion chamber 30 may include two or more intake valves and/or two or more exhaust valves.

In this example, intake valve 52 and exhaust valve 54 may be controlled by cam actuation via respective cam actuation systems 51 and 53. Cam actuation systems 51 and 53 may each include one or more cams and may utilize one or more cam profile switching (CPS), variable cam timing (VCT) variable valve timing (VVT), and/or variable valve lift (VVL) systems that may be operated by controller 12 to vary valve operation. The position of intake valve 52 and exhaust valve 54 may be determined by position sensors 55 and 56, respectively. In alternative embodiments, intake valve 52 and/or exhaust valve 54 may be controlled by electric valve actuation. For example, cylinder 30 may alternatively include an intake valve controlled via electric valve actuation and an exhaust valve controlled via cam actuation including CPS and/or VCT systems.

Fuel injector 66 is shown arranged in intake manifold 44 in a configuration that provides what is known as port injection of fuel into the intake port upstream of combustion chamber 30. Fuel injector 66 may inject fuel in proportion to the pulse width of signal received from controller 12 via electronic driver 68. Fuel may be delivered to fuel injector 66 by a fuel injection system (not shown) including a fuel tank, a fuel pump, and a fuel rail. In some embodiments, combustion chamber 30 may alternatively or additionally include a fuel injector coupled directly to combustion chamber 30 for injecting fuel directly therein, in a manner known as direct injection. It should be appreciated that while a single fuel injector is depicted in the figure, the system may include a plurality of fuel injectors. For example, in some instances, each cylinder of the engine may correspond to a fuel injector.

Ignition system 88 can provide an ignition spark to combustion chamber 30 via spark plug 92 in response to spark advance signal from controller 12, under select operating modes. Though spark ignition components are shown, in some embodiments, combustion chamber 30 or one or more other combustion chambers of engine 10 may be operated in a compression ignition mode, with or without an ignition spark.

Exhaust gas sensor 126 is shown coupled to exhaust passage 48 of exhaust system 50 upstream of emission control device 70. Sensor 126 may be any suitable sensor for providing an indication of exhaust gas air-fuel ratio such as a linear oxygen sensor or universal or wide-range exhaust gas oxygen (UEGO) sensor, a two-state oxygen sensor or EGO, a HEGO (heated EGO), a NOx, HC, or CO sensor. In some embodiments, exhaust gas sensor 126 may be a first one of a plurality of gas sensors positioned in the exhaust system. For example, additional exhaust gas sensors may be positioned downstream of emission control 70. In other examples, a sensor may be positioned in respective exhaust gas manifolds. The sensor 126 may have a 1:4 configuration in which the sensor 126 corresponds to four cylinders or chambers, such as in a standard UEGO sensor configuration (e.g., on a V8 engine), or a 1:2 sensor to cylinder ratio configuration in which the sensor 126 corresponds to two cylinders or chambers, such as in a quad-UEGO sensor configuration. As is described below, the methods herein provided may be executed in a 1:2 sensor to cylinder configuration environment.

Emission control device 70 is shown arranged along exhaust passage 48 downstream of exhaust gas sensor 126. Emission control device 70 may be a three way catalyst (TWC), NOx trap, various other emission control devices, or combinations thereof. In some embodiments, emission control device 70 may be a first one of a plurality of emission control devices positioned in the exhaust system. In some embodiments, during operation of engine 10, emission control device 70 may be periodically reset by operating at least one cylinder of the engine within a particular air-fuel ratio.

Controller 12 is shown in FIG. 1 as a microcomputer, including microprocessor unit 102, input/output ports 104, an electronic storage medium for executable programs and calibration values shown as read-only memory 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal from sensor 118 (or other type) coupled to crankshaft 40; throttle position from a throttle position sensor; and absolute manifold pressure signal from sensor 122. An engine speed signal may be generated by controller 12 from output of sensor 118. A manifold pressure signal from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses every revolution of the crankshaft.

Furthermore, at least some of the above described signals may be used in the exhaust gas sensor degradation determination method described in further detail below. For example, the inverse of the engine speed may be used to determine delays associated with the injection-intake-compression-expansion-exhaust cycle. As another example, the inverse of the velocity (or the inverse of the MAF signal) may be used to determine a delay associated with travel of the exhaust gas from the exhaust valve 54 to exhaust gas sensor 126. The above described examples, along with other use of engine sensor signals, may be used to determine the time delay between a change in the commanded air-fuel ratio and the exhaust gas sensor response rate.

In some embodiments, exhaust gas sensor degradation determination may be performed in a dedicated controller 140. Dedicated controller 140 may include processing resources 142 to handle signal-processing associated with production, calibration, and validation of the degradation determination of exhaust gas sensor 126. In particular, a sample buffer (e.g., generating approximately 100 samples per second per engine bank) utilized to record the response rate of the exhaust gas sensor may be too large for the processing resources of a powertrain control module (PCM) of the vehicle. Accordingly, dedicated controller 140 may be operatively coupled with controller 12 to perform the exhaust gas sensor degradation determination. Note that dedicated controller 140 may receive engine parameter signals from controller 12 to perform the exhaust gas sensor degradation determination. Note that dedicated controller 140 may receive engine parameter signals from controller 12 and may send engine control signals and degradation determination information among other communications to controller 12. Controller 12 and/or dedicated controller 140 may send and receive messages to human/machine interface 143 (e.g., a touch screen display, light, display panel, etc.).

Note that storage medium read-only memory 106 and/or processing resources 142 can be programmed with computer readable data representing instructions executable by processor 102 and/or dedicated controller 140 for performing the methods described below as well as other variants.

As described herein fuel shut-off may be an operation in the engine 10 of the vehicle where fuel supply to the combustion chamber 30 is suspended and then may be subsequently unsuspended. For example, when the throttle is substantially closed and the engine speed is above a threshold value entry into fuel shut-off may be initiated. Likewise, when a request for increased speed is received by the controller 12 (e.g., the throttle is opened) and/or the engine speed falls below the threshold value exit out of fuel shut-off may be initiated. In this way, fuel economy in the vehicle may be increased. Additionally or alternatively, fuel shut-off may be triggered based on engine temperature. It will be appreciated that other fuel shut-off triggers and techniques have been contemplated.

As discussed above, exhaust gas sensor degradation may be determined based on any one, or in some examples each, of six discrete behaviors indicated by delays in the response rate of air-fuel ratio readings generated by an exhaust gas sensor during rich-to-lean transitions and/or lean-to-rich transitions. FIGS. 2-7 each show a graph indicating one of the six discrete types of exhaust gas sensor degradation behaviors. The graphs plot air-fuel ratio (lambda) versus time (in seconds). In each graph, the dotted line indicates a commanded lambda signal that may be sent to engine components (e.g., fuel injectors, cylinder valves, throttle, spark plug, etc.) to generate an air-fuel ratio that progresses through a cycle comprising one or more lean-to-rich transitions and one or more rich-to-lean transitions. In each graph, the dashed line indicates an expected lambda response time of an exhaust gas sensor. In each graph, the solid line indicates a degraded lambda signal that would be produced by a degraded exhaust gas sensor in response to the commanded lambda signal. In each of the graphs, the double arrow lines indicate where the given degradation behavior type differs from the expected lambda signal.

Figures 2, 3, 4, 5, 6, 7:
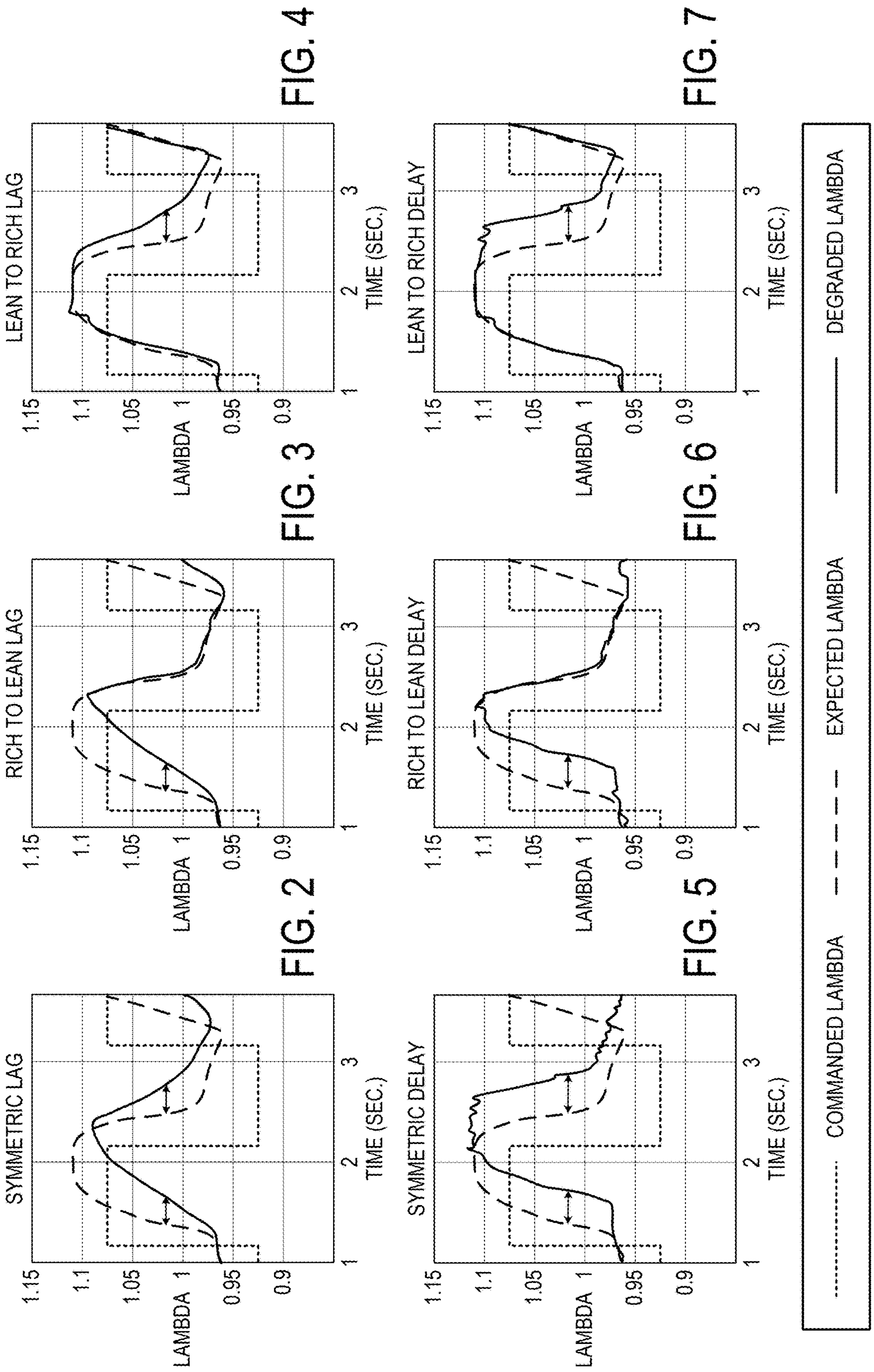
FIG. 2 shows a graph indicating a symmetric filter type degradation behavior of an exhaust gas sensor.
FIG. 3 shows a graph indicating an asymmetric rich-to-lean filter type degradation behavior of an exhaust gas sensor.
FIG. 4 shows a graph indicating an asymmetric lean-to-rich filter type degradation behavior of an exhaust gas sensor.
FIG. 5 shows a graph indicating a symmetric delay type degradation behavior of an exhaust gas sensor.
FIG. 6 shows a graph indicating an asymmetric rich-to-lean delay type degradation behavior of an exhaust gas sensor.
FIG. 7 shows a graph indicating an asymmetric lean-to-rich delay type degradation behavior of an exhaust gas sensor.

FIG. 2 shows a graph indicating a first type of degradation behavior that may be exhibited by a degraded exhaust gas sensor. The first type of degradation behavior is a symmetric filter type that includes slow exhaust gas sensor response to the commanded lambda signal for both rich-to-lean and lean-to-rich modulation. In other words, the degraded lambda signal may start to transition from rich-to-lean and lean-to-rich at the expected times but the response rate may be lower than the expected response rate, which results in reduced lean and rich peak times.

FIG. 3 shows a graph indicating a second type of degradation behavior that may be exhibited by a degraded exhaust gas sensor. The second type of degradation behavior is an asymmetric rich-to-lean filter type that includes slow exhaust gas sensor response to the commanded lambda signal for a transition from rich-to-lean air-fuel ratio. This behavior type may start the transition from rich-to-lean at the expected time but the response rate may be lower than the expected response rate, which may result in a reduced lean peak time. This type of behavior may be considered asymmetric because the response of the exhaust gas sensor is only slow (or lower than expected) during the transition from rich-to-lean.

FIG. 4 shows a graph indicating a third type of degradation behavior that may be exhibited by a degraded exhaust gas sensor. The third type of behavior is an asymmetric lean-to-rich filter type that includes slow exhaust gas sensor response to the commanded lambda signal for a transition from lean-to-rich air-fuel ratio. This behavior type may start the transition from lean-to-rich at the expected time but the response rate may be lower than the expected response rate, which may result in a reduced rich peak time. This type of behavior may be considered asymmetric because the response of the exhaust gas sensor is only slow (or lower than expected) during the transition from lean-to-rich.

FIG. 5 shows a graph indicating a fourth type of degradation behavior that may be exhibited by a degraded exhaust gas sensor. This fourth type of degradation behavior is a symmetric delay type that includes a delayed response to the commanded lambda signal for both rich-to-lean and lean-to-rich modulation. In other words, the degraded d lambda signal may start to transition from rich-to-lean and lean-to-rich at times that are delayed from the expected times, but the respective transition may occur at the expected response rate, which results in shifted lean and rich peak times.

FIG. 6 shows a graph indicating a fifth type of degradation behavior that may be exhibited by a degraded exhaust gas sensor. This fifth type of degradation behavior is an asymmetric rich-to-lean delay type that includes a delayed response to the commanded lambda signal from the rich-to-lean air-fuel ratio. In other words, the degraded lambda signal may start to transition from rich-to-lean at a time that is delayed from the expected time, but the transition may occur at the expected response rate, which results in shifted and/or reduced lean peak times. This type of behavior may be considered asymmetric because the response of the exhaust gas sensor is only delayed from the expected start time during a transition from rich-to-lean.

FIG. 7 shows a graph indicating a sixth type of degradation behavior that may be exhibited by a degraded exhaust gas sensor. This sixth type of behavior is an asymmetric lean-to-rich delay type that includes a delayed response to the commanded lambda signal from the lean-to-rich air-fuel ratio. In other words, the degraded lambda signal may start to transition from lean-to-rich at a time that is delayed from the expected time, but the transition may occur at the expected response rate, which results in shifted and/or reduced rich peak times. This type of behavior may be considered asymmetric because the response of the exhaust gas sensor is only delayed from the expected start time during a transition from lean-to-rich.

It will be appreciated that a degraded exhaust gas sensor may exhibit one or more degradation behaviors or a combination of two or more of the above described degradation behaviors. For example, a degraded exhaust gas sensor may exhibit an asymmetric rich-to-lean filter degradation behavior (e.g., FIG. 3) as well as an asymmetric rich-to-lean delay degradation behavior (e.g., FIG. 6).

In some examples, determination of whether fuel shut-off conditions are met may include determining, estimating, and/or measuring current engine operating parameters. Fuel shut-off conditions may include but are not limited to, one or more of a foot drive pedal not being depressed, a constant or decreasing vehicle speed, and a wheel caliper pedal being depressed. A foot drive pedal position sensor may be used to determine the foot drive pedal position. The foot drive pedal position may occupy a base position when the foot drive pedal is not applied or depressed, and the foot drive pedal may move away from the base position as foot drive application is increased. Additionally or alternatively, foot drive pedal position may be determined via a throttle position sensor in examples where the foot drive pedal is coupled to the throttle or in examples where the throttle is operated in a foot drive pedal follower mode. A constant or decreasing vehicle speed may be preferred for a fuel shut-off to occur due to a torque demand being either constant or not increasing. The vehicle speed may be determined by a vehicle speed sensor. The wheel caliper pedal being depressed may be determined via a wheel caliper pedal sensor. In some examples, other suitable conditions may exist for entering fuel shut-off.

Turning now to FIG. 8, a plurality of graphs 800 are shown depicting typical injector ramping entering a fuel shut-off event. It will be appreciated that each graph may be plotted with a set of exhaust gas sensor response samples collected during a fuel shut-off transition (e.g., entry). The exhaust gas sensor responses shown in FIG. 8 may be responses from the exhaust gas sensor 126 of engine 10 shown in FIG. 1, or another suitable exhaust gas sensor. The plurality of graphs 800 may be time aligned, in some examples. The plurality of graphs 800 includes a first graph 802 plotting lambda vs time (in seconds), a second graph 808 plotting mass flow rate (e.g., lbm/min) of a first cylinder bank vs time, a third graph 818 plotting mass flow rate of a second cylinder bank vs time, and a fourth graph 828 plotting bank timers used to estimate exhaust gas sensor delay vs time. The first cylinder bank may include first, second, third, and fourth cylinders while the second cylinder bank may include fifth, sixth, seventh, and eighth cylinders when the engine is an eight-cylinder (e.g., V-8) engine.

The first graph 802 includes a first plot 804 and a second plot 806. The first plot 804 may correspond to the first bank and the second plot 806 may correspond to the second bank. The first bank may lead the second bank in a rich-to-lean reaction, represented by the lambda of the first plot 804 rising earlier than the lambda of the second plot 806. This is a result of the first bank injectors ramping off earlier than the second bank injectors, as demonstrated in the second and third graphs 808, 818. The second graph 808 includes a first plot 810, a second plot 812, a third plot 814, and a fourth plot 816. The first plot 810 may correspond to the first cylinder, the second plot 812 may correspond to the second cylinder, the third plot 814 may correspond to the third cylinder, and the fourth plot 816 may correspond to the fourth cylinder. Similarly, the third graph 818 includes a first plot 820, a second plot 822, a third plot 824, and a fourth plot 826. The first plot 820 may correspond to the fifth cylinder, the second plot 822 may correspond to the sixth cylinder, the third plot 824 may correspond to the seventh cylinder, and the fourth plot 826 may correspond to the eighth cylinder.

In the second and third graphs 808, 818, the first plots (e.g., first plot 810 and first plot 820) may have a drop in mass flow rate to the corresponding cylinder, corresponding to a respective injector ramping off. The second through fourth plots may then sequentially have drops in mass flow rate corresponding to respective injectors ramping off. In each of the second and third graphs 808, 818, a roughly 800 ms delay may exist between the first plot having a drop in mass flow rate and the fourth plot having a drop in mass flow rate. While it is shown and described herein that the first cylinder injector ramps off first, then the second cylinder injector, then the third, and fourth of the first bank, it should be understood that the ramping order can vary from fuel shut-off event to fuel shut-off event and the delay between successive plot drops may vary from fuel shut-off event to fuel shut-off event. In some examples, the delay between the first plot drop and the fourth plot drop may be approximately equal to the delay that the exhaust gas sensor sees when all injectors are off.

The fourth graph 828 includes a first plot 830 and a second plot 832. The first plot 830 may correspond to a timer of the first cylinder bank and the second plot 832 may correspond to a timer of the second cylinder bank. The timers may be used to estimate the exhaust gas sensor delay. The timers may start following the first cylinder fuel mass flow rate drop, as described with respect to the third graph 818, and may stop when the exhaust gas sensor lambda exceeds a predetermined threshold value.

FIG. 9 shows an example version of engine 10 that includes multiple cylinders arranged in a V configuration. In this example, engine 10 is configured as a variable displacement engine (VDE), wherein the engine 10 may be operated in one of V-8 mode (e.g., eight-cylinder mode with all eight cylinders activated) and V-4 mode (e.g., four-cylinder mode with four of eight cylinders deactivated). The example shown in FIG. 9 depicts V-8 mode.

Engine 10 includes a plurality of combustion chambers or cylinders 30 as previously described. The plurality of cylinders 30 of engine 10 are arranged as groups of cylinders on distinct engine banks. In the depicted example, engine 10 includes two cylinder banks, first bank 902 and second bank 904. Thus, the cylinders are arranged as a first group of cylinders (four cylinders in the depicted example) arranged on first bank 902 and a second group of cylinders (four cylinders in the depicted example) arranged on second bank 904. The first group of cylinders may include first cylinder 906, second cylinder 908, third cylinder 910, and fourth cylinder 912 and the second group of cylinders may include fifth cylinder 914, sixth cylinder 916, seventh cylinder 918, and eighth cylinder 920. It will be appreciated that while the example depicted in FIG. 9 shows a V-engine with cylinders arranged on different banks, this is not meant to be limiting, and in alternate examples, the engine may be an in-line engine with all engine cylinders on a common engine bank.

Engine 10 can receive intake air via an intake passage 42 communicating with branched intake manifold 44. The branched intake manifold 44, as depicted in FIG. 9, may include multiple branches to each of the first and second banks 902, 904. While first and second banks 902, 904 are shown with a common intake manifold, it will be appreciated that in alternate examples, the engine may include two separate intake manifolds. The amount of air supplied to the cylinders of the engine can be controlled by adjusting a position of throttle 62 on throttle plate 64. Additionally, an amount of air supplied to each group of cylinders on the specific banks can be adjusted by varying an intake valve timing of one or more intake valves coupled to the cylinders.

The engine 10 may comprise one or more exhaust gas sensors, as previously described. The example depicted in FIG. 9 includes four exhaust gas sensors each with a 1:2 configuration, such as those used for a quad-UEGO sensor configuration. For example, a first exhaust gas sensor 922 may sense air-fuel ratio in a first exhaust gas manifold 930 in communication with the first and second cylinders 906, 908 of the first bank 902 and a second exhaust gas sensor 924 may sense air-fuel ratio in a second exhaust gas manifold 932 in communication with the third and fourth cylinders 910, 912 of the first bank 902. A third exhaust gas sensor 926 may sense air-fuel ratio in a third exhaust gas manifold 934 in communication with the fifth and seventh cylinders 914, 918 of the second bank 904 and a fourth exhaust gas sensor 928 may sense air-fuel ratio in a fourth exhaust gas manifold 936 in communication with the sixth and eighth cylinders 916, 920 of the second bank 904.

On an eight-cylinder engine with a cross-plane crankshaft, firings of the four cylinders in the same cylinder bank are unevenly spaced with firing spacing of 90, 180, and 270 crank-angle degrees. A 1:4 sensor to cylinder configuration may result in varying residency times at the exhaust gas sensor of the exhausted cylinder flows. For example, a cylinder preceded or followed by another cylinder firing 90 crank-angle degrees apart may have a short residency time and an especially weak exhaust gas sensor reading. A 1:2 sensor to cylinder configuration, where cylinders firing 90 crank-angle degree apart do not share the same UEGO sensor, may reduce the variation in residency times and reduce the chance of a weak UEGO sensor reading.

FIG. 10 shows the engine 10 as described with respect to FIG. 9 in V-4 mode (e.g., VDE mode), as such similar component numbering is used and components will not be reintroduced. In V-4 mode, the engine 10 includes the same cylinders as in V-8 mode, with half (e.g., a first subset) of the cylinders with deactivated intake and exhaust valves and the other half (e.g., a second subset) with activated intake and exhaust valves. As an example, as depicted in FIG. 10, one of two cylinders that correspond to a single exhaust gas sensor may have deactivated intake and exhaust valves while the other cylinder has activated intake and exhaust valves such that the exhaust gas sensor is sensing air-fuel ratio for only one of the two cylinders. For example, in the first bank 902, the first cylinder 906 and the fourth cylinder 912 have active intake and exhaust valves while the second and third cylinders 908, 910 have deactivated intake and exhaust valves. In this way, exhaust from the first cylinder 906 may be sensed by the first exhaust gas sensor 922 while the second cylinder 908 is deactivated and exhaust from the fourth cylinder 912 may be sensed by the second exhaust gas sensor 924 while the third cylinder 910 is deactivated. In the second bank 904, the sixth and seventh cylinders 916, 918 have active intake and exhaust valves while the fifth cylinder 914 and eighth cylinder 920 have inactive intake and exhaust valves. In this way, exhaust from the seventh cylinder 918 may be sensed by the third exhaust gas sensor 926 while the fifth cylinder 914 is deactivated and exhaust from the sixth cylinder 916 may be sensed by the fourth exhaust gas sensor 928 while the eighth cylinder 920 is deactivated.

Entering VDE prior to either fuel shut-off entry or exit may comprise disabling intake and exhaust valves of one of the first and second subsets of cylinders and then once in VDE, ramping injectors off or on for the other of the first and second subsets to enter or exit fuel shut-off. For example, entering VDE mode prior to a fuel shut-off entry may comprise disabling intake and exhaust valves of the first subset of cylinders which are deactivated in order to enter VDE mode from normal operation. The intake and exhaust valves of the second subset may remain enabled. Fueling to the second subset of cylinders may then be sequentially disabled to enter fuel shut-off. Similarly, entering VDE mode prior to a fuel shut-off exit may additionally comprise enabling intake and exhaust valves of the second subset of cylinders. Fueling to the second subset of cylinders may then be enabled to exit fuel shut-off. Without disabling the intake and exhaust valves of a given subset of cylinders, the ratio of sensors to cylinders may be 1:2. Disabling the intake and exhaust valves of the respective subset of cylinders allows for the ratio of sensors to cylinders when in VDE mode to be 1:1.

While sensor degradation diagnostics during fuel shut-off offers an indirect approach to degradation monitoring, as the engine enters into or exits from fuel shut-off, the injectors can ramp off or on randomly. This random ramping off or on may cause variability in the timestamp of the monitor entries. The spread of the ramping may, in some cases, be equal to or nearly equal to the delay that the diagnostic is to detect. This delay may be around 800 ms, as described above with respect to FIG. 8. Therefore, a fuel shut-off entry or exit with high variability in injector ramping times may not be usable for six-pattern diagnostics, therefore increasing monitor completion time and reducing the efficiency of the monitoring. This variability in injector ramping during fuel shut-off entry/exit may be more significant in 1:4 exhaust gas sensor configurations. The system as herein disclosed may be a 1:2 exhaust gas sensor to cylinder ratio configuration, as previously described, which may help to reduce some of the injector ramping variability as each exhaust gas sensor is responsible for only two cylinders.

Additionally, entering into V-4 mode, when the engine is a VDE, prior to fuel shut-off entry/exit may also reduce the variability in injector ramping because in V-4 mode, each exhaust gas sensor is responsible for sensing air-fuel ratio in only one cylinder.

Figure 11:
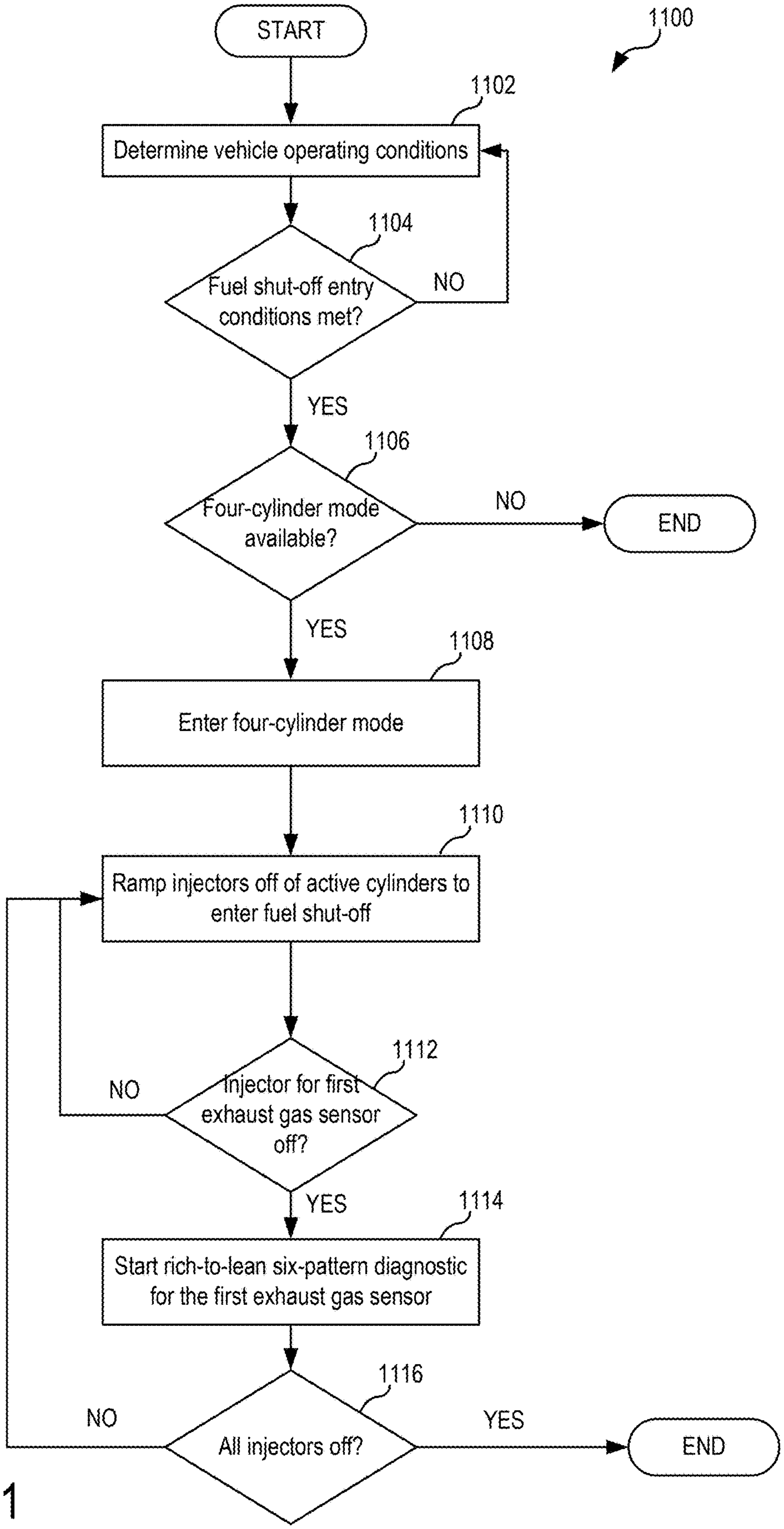
FIG. 11 shows a flowchart illustrating a first method for executing an exhaust gas sensor diagnostic.
Figure 12:
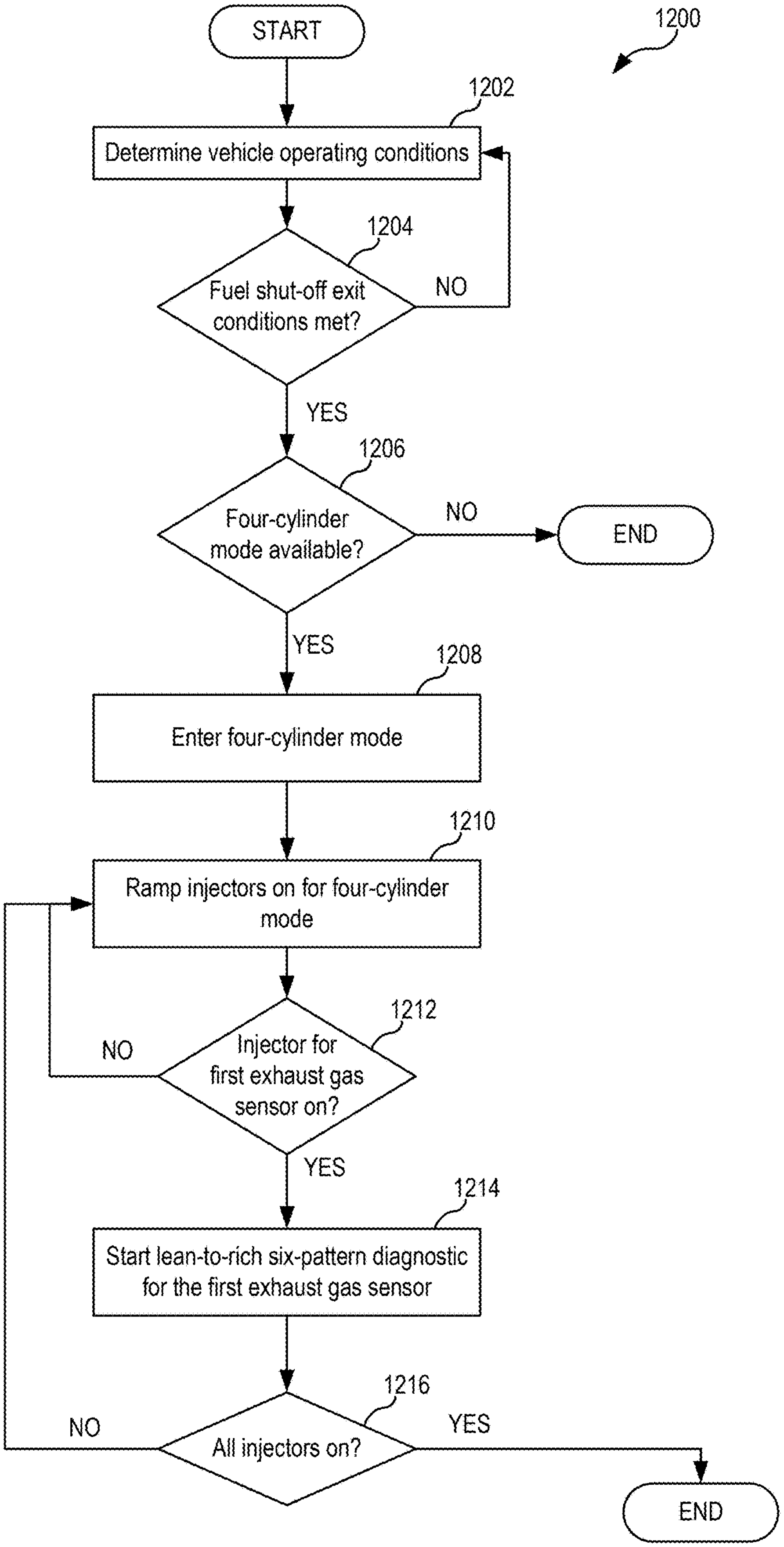
FIG. 12 shows a flowchart illustrating a second method for executing an exhaust gas sensor diagnostic.

FIGS. 11 and 12 show flow charts illustrating methods for executing exhaust gas sensor diagnostics. The methods as herein described include entering into four-cylinder mode (e.g., VDE mode) prior to a fuel shut-off transition, which may either be a fuel shut-off entry or a fuel shut-off exit. FIG. 11 specifically shows a flow chart illustrating a method 1100 for executing exhaust gas sensor diagnostics during fuel shut-off entry and FIG. 12 specifically shows a flow chart illustrating a method 1200 for executing exhaust gas sensor diagnostics during fuel shut-off exit. Both of the methods 1100 and 1200 may be implemented by the vehicle, engine, systems, components, etc. described above with regard to FIG. 1 or may be implemented by another suitable vehicle, engine, system, and components. Specifically, one or more of the steps disclosed in the methods 1100 and/or 1200 may be implemented via the controller 12 and/or controller 140, shown in FIG. 1.

Starting with method 1100, at 1102, method 1100 includes determining, estimating, and/or measuring current engine operating parameters. The current engine operating parameters may include but are not limited to a vehicle speed, throttle position, and/or an air-fuel ratio. Determining the operating conditions may also include determining one or more fuel shut-off conditions. Fuel shut-off entry conditions may include but are not limited to, one or more of a foot drive not being depressed, a constant or decreasing vehicle speed, and a wheel caliper pedal being depressed. A foot drive position sensor may be used to determine the foot drive pedal position. The foot drive pedal position may occupy a base position when the foot drive pedal is not applied or depressed, and the foot drive pedal may move away from the base position as foot drive application is increased. Additionally or alternatively, foot drive pedal position may be determined via a throttle position sensor in examples where the foot drive pedal is coupled to the throttle or in examples where the throttle is operated in a foot drive pedal follower mode. A constant or decreasing vehicle speed may be preferred for a fuel shut-off to occur due to a torque demand being either constant or not increasing. The vehicle speed may be determined by a vehicle speed sensor. The wheel caliper pedal being depressed may be determined via a wheel caliper pedal sensor. In some examples, other suitable conditions may exist for entering fuel shut-off.

At 1104, method 1100 includes determining whether one or more fuel shut-off entry conditions are met. As outlined, above, one or more fuel shut-off entry conditions may be met in order for the vehicle and engine to enter into fuel shut-off. If one or more fuel shut-off entry conditions are met (YES at 1104), method 1100 proceeds to 1106. If no fuel shut-off entry conditions are met (NO at 1104), method 1100 returns to 1102.

At 1106, method 1100 includes determining whether four-cylinder (e.g., V-4) mode is available. Four-cylinder mode may not be available in case of an error of the VDE system, for example if an actuator to deactivate an intake and/or exhaust valve has an error. Four-cylinder mode may also not be available if one or more entry conditions for four-cylinder mode are not met, such as oil pressure being below a threshold in case of hydraulic valve deactivation actuators. Four-cylinder mode may be available when the VDE system is working properly and entry conditions are met. Further, in some examples, while four-cylinder mode may be available based on the VDE system and entry conditions, factors such as fuel consumption or noise, vibration, and harshness may render four-cylinder mode less advisable in context than remaining in eight-cylinder mode and thus four-cylinder mode may not be available. If four-cylinder mode is available (YES at 1106), method 1100 proceeds to 1108. If four-cylinder mode is not available (NO at 1106), method 1100 ends. In the event that four-cylinder mode is unavailable, the method 1100 may be repeated at a later time in order to again determine whether V4 mode is available in order to proceed to executing a six-pattern diagnostic.

At 1108, method 1100 includes entering four-cylinder mode (e.g., VDE mode). Entering four-cylinder mode includes both ramping injectors off for a first subset of the engine's eight cylinders and disabling intake and exhaust valves for the first subset of cylinders. As such, in VDE mode, deactivated cylinders may have disabled intake and exhaust valves and activated cylinders may have enabled intake and exhaust valves. For example, in the engine described above with respect to FIGS. 9 and 10, injectors corresponding to the second, third, fifth, and eighth cylinders may be ramped off, deactivating each of those cylinders.

At 1110, method 1100 includes ramping injectors off for the active cylinders in four-cylinder mode to enter fuel shut-off. The active cylinders may be those with active intake and exhaust valves and active injectors. In the example described above and with respect to FIGS. 9 and 10, the active cylinders may be the first, fourth, sixth, and seventh cylinders. Ramping off the active cylinders may include sequentially disabling the injectors of the active cylinders to deactivate those cylinders. Ramping off the active cylinders may enter the engine into fuel shut-off. The cylinders that are deactivated at 1110 may continue to have enabled intake and exhaust valves.

At 1112, method 1100 determines whether an injector for a first exhaust gas sensor has ramped off. The first exhaust gas sensor may be a selected sensor that is to be diagnosed for potential degradation. The injector may correspond to one of the injectors that are ramped off at 1110. If the injector for the first exhaust gas sensor has not ramped off (NO at 1112), method 1100 returns to 1110 to continue ramping off injectors. If the injector for the first exhaust gas sensor has ramped off (YES at 1112), method 1100 proceeds to 1114.

At 1114, method 1100 includes starting a rich-to-lean six-pattern diagnostic for the first exhaust sensor. Once the corresponding injector is disabled, the six-pattern diagnostic, for a rich-to-lean transition, may be started. In some examples, this may include incrementing an individual timer to measure a time duration from turning the injector off until lambda exceeds a predetermined threshold value. If the duration is above a threshold duration (e.g., the duration is longer than expected), then the exhaust gas sensor has rich-to-lean delay or filter type degradation.

Method 1100 may include repeating determination of whether an injector corresponding to an exhaust gas sensor is ramped off (as at 1112) for each of the four active cylinders in four-cylinder mode. For example, the method 1100 may determine whether an injector corresponding to a second exhaust gas sensor has ramped off. Further, method 1100 may include performing the six-pattern diagnostic for each exhaust gas sensor independently (as at 1114). For example, when an injector of a first active cylinder is disabled, a first timer may be started to measure a first duration until the lambda measured by the first exhaust gas sensor exceeds the threshold. Then, when an injector of a second active cylinder is disabled, a second timer may be started to measure a second duration until the lambda measured by a second exhaust gas sensor exceeds a second threshold. As such, the steps described at 1112 and 1114 may be repeated for each of the four exhaust gas sensors in order to determine degradation patterns thereof.

At 1116, method 1100 includes determining whether all injectors have ramped off. If not all the injectors have ramped off, method 1100 returns to 1110 to continue ramping injectors off for the active cylinders. If all injectors have ramped off, all the cylinders of the engine may be deactivated and the system may be in fuel shut-off and the method 1100 may end.

The six-pattern diagnostic may produce results for determining whether exhaust gas sensor degradation has occurred or is working as expected. If exhaust gas sensor degradation has occurred, adjustment of engine operation based on the exhaust gas sensor may be inhibited temporarily.

The method 1200 of FIG. 12 follows a similar flow path of steps as the method 1100, except for exiting fuel shut-off rather than entering fuel shut-off. As such, at 1202, method 1200 includes determining vehicle operating conditions, including but not limited to vehicle speed, throttle position, and/or an air-fuel ratio, as well as one or more fuel shut-off conditions such as foot drive pedal position, wheel caliper pedal position, and the like as previously discussed.

At 1204, method 1200 includes determining whether fuel shut-off exit conditions are met. Fuel shut-off exit conditions may include but are not limited to, one or more of a foot drive pedal being depressed, an increasing vehicle speed, and a wheel caliper pedal being at a base position. If one or more fuel shut-off exit conditions are met (YES at 1204), method 1200 proceeds to 1206. If no fuel shut-off exit conditions are met (NO at 1204), method 1200 returns to 1202.

At 1206, method 1200 includes determining if four-cylinder mode is available. If four-cylinder mode is available, method 1200 proceeds to 1208. If four-cylinder mode is not available for one or more of the reasons discussed above, method 1200 ends.

At 1208, method 1200 includes entering four-cylinder mode (e.g., VDE mode). Entering four-cylinder mode from fuel shut-off includes enabling intake and exhaust valves for a first subset of cylinders and disabling intake and exhaust valves for a second subset of cylinders. As noted above, in fuel shut-off all injectors have ramped off such that all cylinders are deactivated. In some examples, intake and exhaust valves may all be disabled when in fuel shut-off, in which case entering VDE mode may involve enabling intake and exhaust valves for the first subset of cylinders. In other examples, intake and exhaust valves may all be enabled when in fuel shut-off, in which case entering VDE mode may involve disabling intake and exhaust valves for the second subset of cylinders. In either case, fueling to the cylinders may remain deactivated in VDE mode. As an example, intake and exhaust valves corresponding to the first, fourth, sixth, and seventh cylinders of the engine described with respect to FIGS. 9 and 10, may be enabled and intake and exhaust valves of the second, third, fifth, and eighth cylinders may be disabled.

At 1210, method 1200 includes ramping injectors on for the first subset of cylinders (e.g., the cylinders with enabled intake and exhaust valves). In the example presented above and with respect to FIGS. 9 and 10, the first, fourth, sixth, and seventh cylinders may be sequentially activated by ramping on corresponding injectors. Ramping on injectors for cylinders with active intake and exhaust valves while the other subset of cylinders have disabled intake and exhaust valves may maintain the 1:1 sensor to cylinder ratio.

At 1212, method 1200 determines whether an injector for a first exhaust gas sensor has ramped on. The first exhaust gas sensor may be a selected sensor that is to be diagnosed for potential degradation. If the injector for the first exhaust gas sensor has not ramped on (NO at 1212), method 1200 returns to 1210 to continue ramping on injectors. If the injector for the first exhaust gas sensor has ramped on (YES at 1212), method 1200 proceeds to 1214.

At 1214, method 1200 includes starting a lean-to-rich six-pattern diagnostic for the first exhaust sensor. Once the corresponding injector is ramped on, the six-pattern diagnostic, for a lean-to-rich transition, may be started. In some examples, this may include incrementing an individual timer to measure a time duration from turning the injector on until lambda drops below a predetermined threshold value. If the duration is above a threshold duration, then the exhaust gas sensor has lean-to-rich delay. As with method 1100, method 1200 includes repeating the above determination and execution of six-pattern diagnostic sequentially for each of the exhaust gas sensors as the remaining deactivated cylinders are activated by ramping on corresponding injectors. For example, when an injector of a first active cylinder is enabled, a first timer may be started to measure a first duration until the lambda measured by the first exhaust gas sensor drops below the threshold. Then, when an injector of a second active cylinder is enabled, a second timer may be started to measure a second duration until the lambda measured by a second exhaust gas sensor drops below a second threshold. As such, the steps described at 1212 and 1214 may be repeated for each of the four exhaust gas sensors in order to determine degradation patterns thereof.

At 1216, method 1200 includes determining if all injectors for the four-cylinder mode has ramped on. If not all injectors have ramped on, method 1200 returns to 1210 to continue ramping on injectors to exit fuel shut-off. If all injectors have ramped on, the engine may have exited out of fuel shut-off and method 1200 may end.

The six-pattern diagnostic may produce results for determining whether exhaust gas sensor degradation has occurred or is working as expected. If exhaust gas sensor degradation has occurred, adjustment of engine operation based on the exhaust gas sensor may be inhibited temporarily.

Entering into four-cylinder mode when the engine includes exhaust gas sensors that have 1:2 configurations allows for each exhaust gas sensor to see only one active cylinder. Having a 1:1 ratio between sensors and cylinders during monitoring and diagnostics may reduce injector ramping variability and therefore increase efficiency and usability of fuel shut-off based six-pattern diagnostic entries.

The disclosure also provides support for a method of monitoring an exhaust gas sensor coupled in an engine exhaust in an engine, comprising: entering variable displacement engine (VDE) mode wherein intake and exhaust valves of a first subset of cylinders of the engine are activated and intake and exhaust valves of a second subset of cylinders are deactivated prior to a reduced traction fuel shut-off transition, and executing a six-pattern diagnostic during fuel shut-off to identify exhaust gas sensor degradation. In a first example of the method, the engine is an eight-cylinder engine and the first subset of cylinders that have activated intake and exhaust valves in VDE mode includes four cylinders. In a second example of the method, optionally including the first example, the engine comprises four exhaust gas sensors, each with a 1:2 sensor to cylinder ratio. In a third example of the method, optionally including one or both of the first and second examples in VDE mode, each exhaust gas sensor senses air-fuel ratio in one of the first subset of cylinders. In a fourth example of the method, optionally including one or more or each of the first through third examples, the method further comprises: adjusting engine operation responsive to identification of exhaust gas sensor degradation, the degradation identified during fuel shut-off. In a fifth example of the method, optionally including one or more or each of the first through fourth examples, the fuel shut-off transition is one of a fuel shut-off entry and a fuel shut-off exit. In a sixth example of the method, optionally including one or more or each of the first through fifth examples when the fuel shut-off transition is fuel shut-off entry, entering VDE mode includes ramping off injectors corresponding to the second subset of cylinders, the second subset of cylinders not including any of the first subset of cylinders. In a seventh example of the method, optionally including one or more or each of the first through sixth examples when the fuel shut-off transition is fuel shut-off exit, reduced traction fuel shut-off transition includes ramping on injectors corresponding to the first subset of cylinders.

The disclosure also provides support for a system for a vehicle, comprising: an engine including a fuel injection system and eight cylinders, a plurality of exhaust gas sensors coupled in an exhaust system of the engine, and a controller including instructions stored in memory executable by a processor to: enter four-cylinder mode prior to a reduced traction fuel shut-off transition, and execute a fuel shut-off based six-pattern diagnostic of one or more of the plurality of exhaust gas sensors to identify one or more degradation behaviors thereof. In a first example of the system, entering four-cylinder mode comprises ramping off injectors of the fuel injection system corresponding to a first subset of the eight cylinders and disabling intake and exhaust valves of the first subset of the eight cylinders when the fuel shut-off transition is a fuel shut-off entry. In a second example of the system, optionally including the first example, entering four-cylinder mode comprises enabling intake and exhaust valves of the fuel injection system corresponding to a second subset of the eight cylinders and disabling intake and exhaust valves of a first set of the eight cylinders when the fuel shut-off transition is a fuel shut-off exit. In a third example of the system, optionally including one or both of the first and second examples, each of the plurality of exhaust gas sensors is configured to sense air-fuel ratio in two corresponding cylinders. In a fourth example of the system, optionally including one or more or each of the first through third examples, the engine comprises a first bank of cylinders and a second bank of cylinders, the first bank comprising first, second, third, and fourth cylinders and the second bank comprising fifth, sixth, seventh, and eighth cylinders, wherein a first exhaust gas sensor is positioned in a first exhaust gas manifold in communication with the first and second cylinders, a second exhaust gas sensor is positioned in a second exhaust gas manifold in communication with the third and fourth cylinders, a third exhaust gas sensor is positioned in a third exhaust gas manifold in communication with the fifth and seventh cylinders, and a fourth exhaust gas sensor is positioned in a fourth exhaust gas manifold in communication with the sixth and eighth cylinders. In a fifth example of the system, optionally including one or more or each of the first through fourth examples, in four-cylinder mode, the first, fourth, sixth, and seventh cylinders are activated and the second, third, fifth, and eighth cylinders are deactivated.

The disclosure also provides support for a method of monitoring exhaust gas sensors coupled in an engine exhaust of an engine, comprising: prior to a reduced traction fuel shut-off transition, entering the engine into four-cylinder mode, entering the reduced traction fuel shut-off transition, in response to determination that an injector corresponding to a first exhaust gas sensor has ramped off when the fuel shut-off transition is an entry or on when the fuel shut-off transition is an exit, incrementing an individual timer for the exhaust gas sensor to start a sensor delay timer of a six-pattern diagnostic, and executing the six-pattern diagnostic to identify one or more degradation behaviors in the first exhaust gas sensor. In a first example of the method, the method further comprises: in response to identification of degradation of the exhaust gas sensor, adjusting engine operation. In a second example of the method, optionally including the first example, the engine a variable displacement engine comprising eight cylinders and four exhaust gas sensors and wherein each of the four exhaust gas sensors is configured with a 1:2 sensor to cylinder ratio. In a third example of the method, optionally including one or both of the first and second examples when the fuel shut-off transition is the entry, entering into four-cylinder mode comprises ramping off injectors corresponding to a first subset of cylinders of the engine and disabling intake and exhaust valves of the first subset of cylinders, and wherein entering the reduced traction fuel shut-off transition comprises sequentially ramping off injectors corresponding to a second subset of cylinders, the second subset of cylinders not including any cylinders of the first subset. In a fourth example of the method, optionally including one or more or each of the first through third examples when the fuel shut-off transition is the exit, entering into four-cylinder mode comprises enabling intake and exhaust valves corresponding to a first subset of cylinders of the engine and disabling intake and exhaust valves of a second subset of cylinders, and wherein entering the reduced traction fuel shut-off transition comprises sequentially ramping on injectors corresponding to the first subset of cylinders, the second subset of cylinders not including any of the first subset. In a fifth example of the method, optionally including one or more or each of the first through fourth examples, the exhaust gas sensor is a universal exhaust gas oxygen (UEGO) sensor and the engine has a quad-UEGO sensor configuration.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method of monitoring an exhaust gas sensor coupled in an engine exhaust in an engine, comprising:
- prior to a reduced traction fuel shut-off transition, entering four-cylinder mode wherein intake and exhaust valves of a first subset of cylinders of the engine are activated and intake and exhaust valves of a second subset of cylinders are deactivated; and
- executing a six-pattern diagnostic during fuel shut-off to identify exhaust gas sensor degradation.

2. The method of claim 1, wherein the engine is an eight-cylinder engine and the first subset of cylinders that have activated intake and exhaust valves in four-cylinder mode includes four cylinders.

3. The method of claim 1, further comprising adjusting engine operation responsive to identification of exhaust gas sensor degradation, the degradation identified during fuel shut-off.

4. The method of claim 1, wherein the engine comprises four exhaust gas sensors, each with a 1:2 sensor to cylinder ratio.

5. The method of claim 4, wherein, in four-cylinder mode, each exhaust gas sensor senses air-fuel ratio in one of the first subset of cylinders.

6. The method of claim 1, wherein the fuel shut-off transition is one of a fuel shut-off entry and a fuel shut-off exit.

7. The method of claim 6, wherein, when the fuel shut-off transition is fuel shut-off entry, entering four-cylinder mode includes ramping off injectors corresponding to the second subset of cylinders, the second subset of cylinders not including any of the first subset of cylinders.

8. The method of claim 6, wherein, when the fuel shut-off transition is fuel shut-off exit, reduced traction fuel shut-off transition includes ramping on injectors corresponding to the first subset of cylinders.

9. A system for a vehicle, comprising:
- an engine including a fuel injection system and eight cylinders;
- a plurality of exhaust gas sensors coupled in an exhaust system of the engine; and
- a controller including instructions stored in memory executable by a processor to:
  - enter four-cylinder mode prior to a reduced traction fuel shut-off transition; and
  - execute a fuel shut-off based six-pattern diagnostic of one or more of the plurality of exhaust gas sensors to identify one or more degradation behaviors thereof.

10. The system of claim 9, wherein entering four-cylinder mode comprises ramping off injectors of the fuel injection system corresponding to a first subset of the eight cylinders and disabling intake and exhaust valves of the first subset of the eight cylinders when the fuel shut-off transition is a fuel shut-off entry.

11. The system of claim 9, wherein entering four-cylinder mode comprises enabling intake and exhaust valves of the fuel injection system corresponding to a second subset of the eight cylinders and disabling intake and exhaust valves of a first set of the eight cylinders when the fuel shut-off transition is a fuel shut-off exit.

12. The system of claim 9, wherein each of the plurality of exhaust gas sensors is configured to sense air-fuel ratio in two corresponding cylinders.

13. The system of claim 9, wherein the engine comprises a first bank of cylinders and a second bank of cylinders, the first bank comprising first, second, third, and fourth cylinders and the second bank comprising fifth, sixth, seventh, and eighth cylinders, wherein a first exhaust gas sensor is positioned in a first exhaust gas manifold in communication with the first and second cylinders, a second exhaust gas sensor is positioned in a second exhaust gas manifold in communication with the third and fourth cylinders, a third exhaust gas sensor is positioned in a third exhaust gas manifold in communication with the fifth and seventh cylinders, and a fourth exhaust gas sensor is positioned in a fourth exhaust gas manifold in communication with the sixth and eighth cylinders.

14. The system of claim 13, wherein in four-cylinder mode, the first, fourth, sixth, and seventh cylinders are activated and the second, third, fifth, and eighth cylinders are deactivated.

15. A method of monitoring exhaust gas sensors coupled in an engine exhaust of an engine, comprising:
- prior to a reduced traction fuel shut-off transition, entering the engine into four-cylinder mode;
- entering the reduced traction fuel shut-off transition,
- in response to determination that an injector corresponding to a first exhaust gas sensor has ramped off when the fuel shut-off transition is an entry or on when the fuel shut-off transition is an exit, incrementing an individual timer for the exhaust gas sensor to start a sensor delay timer of a six-pattern diagnostic; and
- executing the six-pattern diagnostic to identify one or more degradation behaviors in the first exhaust gas sensor.

16. The method of claim 15, further comprising, in response to identification of degradation of the exhaust gas sensor, adjusting engine operation.

17. The method of claim 15, wherein the engine a variable displacement engine comprising eight cylinders and four exhaust gas sensors and wherein each of the four exhaust gas sensors is configured with a 1:2 sensor to cylinder ratio.

18. The method of claim 15, wherein, when the fuel shut-off transition is the entry, entering into four-cylinder mode comprises ramping off injectors corresponding to a first subset of cylinders of the engine and disabling intake and exhaust valves of the first subset of cylinders, and wherein entering the reduced traction fuel shut-off transition comprises sequentially ramping off injectors corresponding to a second subset of cylinders, the second subset of cylinders not including any cylinders of the first subset.

19. The method of claim 15, wherein, when the fuel shut-off transition is the exit, entering into four-cylinder mode comprises enabling intake and exhaust valves corresponding to a first subset of cylinders of the engine and disabling intake and exhaust valves of a second subset of cylinders, and wherein entering the reduced traction fuel shut-off transition comprises sequentially ramping on injectors corresponding to the first subset of cylinders, the second subset of cylinders not including any of the first subset.

20. The method of claim 15, wherein the exhaust gas sensor is a universal exhaust gas oxygen (UEGO) sensor and the engine has a quad-UEGO sensor configuration.

* * * * *